United States Patent
Harada et al.

(10) Patent No.: US 9,641,723 B2
(45) Date of Patent: May 2, 2017

(54) IMAGE PROCESSING APPARATUS WITH IMPROVED SLIDE PRINTOUT BASED ON LAYOUT DATA

(71) Applicant: KYOCERA Document Solutions Inc., Osaka (JP)

(72) Inventors: Hiroyuki Harada, Osaka (JP); Hironori Hayashi, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/002,183

(22) Filed: Jan. 20, 2016

(65) Prior Publication Data

US 2016/0219187 A1     Jul. 28, 2016

(30) Foreign Application Priority Data

Jan. 26, 2015   (JP) .................................. 2015-012609

(51) Int. Cl.
    *G06K 15/02*    (2006.01)
    *H04N 1/387*    (2006.01)
    *G06F 3/12*     (2006.01)

(52) U.S. Cl.
    CPC .......... *H04N 1/3876* (2013.01); *G06F 3/125* (2013.01); *G06F 3/1206* (2013.01); *G06F 3/1243* (2013.01); *G06F 3/1284* (2013.01); *H04N 2201/0094* (2013.01)

(58) Field of Classification Search
    USPC ......................... 358/1.18, 1.15, 3.2–3.24, 1.9
    See application file for complete search history.

(56) References Cited

U.S. PATENT DOCUMENTS

| | | | |
|---|---|---|---|
| 5,907,835 A | 5/1999 | Yokomizo et al. | |
| 5,933,823 A | 8/1999 | Cullen | |
| 2005/0229107 A1* | 10/2005 | Hull | G06F 17/241 715/764 |

FOREIGN PATENT DOCUMENTS

| | | |
|---|---|---|
| JP | H08-161350 | 6/1996 |
| JP | H09-237282 | 9/1997 |
| JP | 2000-048172 | 2/2000 |
| JP | 2004-304546 | 10/2004 |
| JP | 2012-137921 | 7/2012 |

* cited by examiner

*Primary Examiner* — Marcellus Augustin

(57) ABSTRACT

An image processing apparatus includes a layout identifying unit, a slide image extracting unit, and an output processing unit. The layout identifying unit is configured to identify a printing layout of a document image scanned by an image scanning device on the basis of layout data, the layout data indicating plural printing layouts of specific presentation material editing software that builds a slide image. The slide image extracting unit is configured to extract a slide image in the document image in accordance with the identified printing layout. The output processing unit is configured to perform generating a data file of the specific presentation material editing software including the extracted slide image and/or printing of the extracted slide image as an output process of the slide image extracted by the slide image extracting unit.

3 Claims, 5 Drawing Sheets

IMAGE PROCESSING APPARATUS WITH IMPROVED SLIDE PRINTOUT BASED ON LAYOUT DATA

CROSS-REFERENCE TO RELATED APPLICATIONS

This application relates to and claims priority rights from Japanese Patent Application No. 2015-012609, filed on Jan. 26, 2015, the entire disclosures of which are hereby incorporated by reference herein.

BACKGROUND

1. Field of the Present Disclosure

The present disclosure relates to an image processing apparatus.

2. Description of the Related Art

An image forming apparatus detects a boundary between page images in a document image scanned from a document on which a combination of plural page images has been printed as one page, and determines a combination quantity (N of N-in-1 printing) on the basis of the detected boundary.

When a slide image or the like is printed with a specific printing layout by specific presentation material editing software that builds a slide image, the printed matter may include an object other than the slide image, and therefore it is difficult to properly identify a printing layout such as a combination quantity from a document image obtained from the printed matter.

For example, when Microsoft PowerPoint prints a slide image as 3-in-1 handout printing, the obtained printed matter includes three slide images and ruled line sets for note entry in one page so as to associate the ruled line sets with the respective slide images. This printed matter includes three slide images and three ruled line sets in one page and consequently it is possible to improperly identify that the combination quantity is six.

Further, for example, when Microsoft PowerPoint performs note printing, the obtained printed matter includes one slide image and a note (a text) associated with the slide image in one page. This printed matter includes one slide image and one text in one page and consequently it is possible to improperly identify that the combination quantity is two.

SUMMARY

An image processing apparatus according to an aspect of the present disclosure includes a layout identifying unit, a slide image extracting unit, and an output processing unit. The layout identifying unit is configured to identify a printing layout of a document image scanned by an image scanning device on the basis of layout data, the layout data indicating plural printing layouts of specific presentation material editing software that builds a slide image. The slide image extracting unit is configured to extract a slide image in the document image in accordance with the identified printing layout. The output processing unit is configured to perform generating a data file of the specific presentation material editing software including the extracted slide image and/or printing of the extracted slide image as an output process of the slide image extracted by the slide image extracting unit.

These and other objects, features and advantages of the present disclosure will become more apparent upon reading of the following detailed description along with the accompanied drawings.

DETAILED DESCRIPTION

Hereinafter, an embodiment according to aspects of the present disclose will be explained with reference to drawings.

Figure 1:
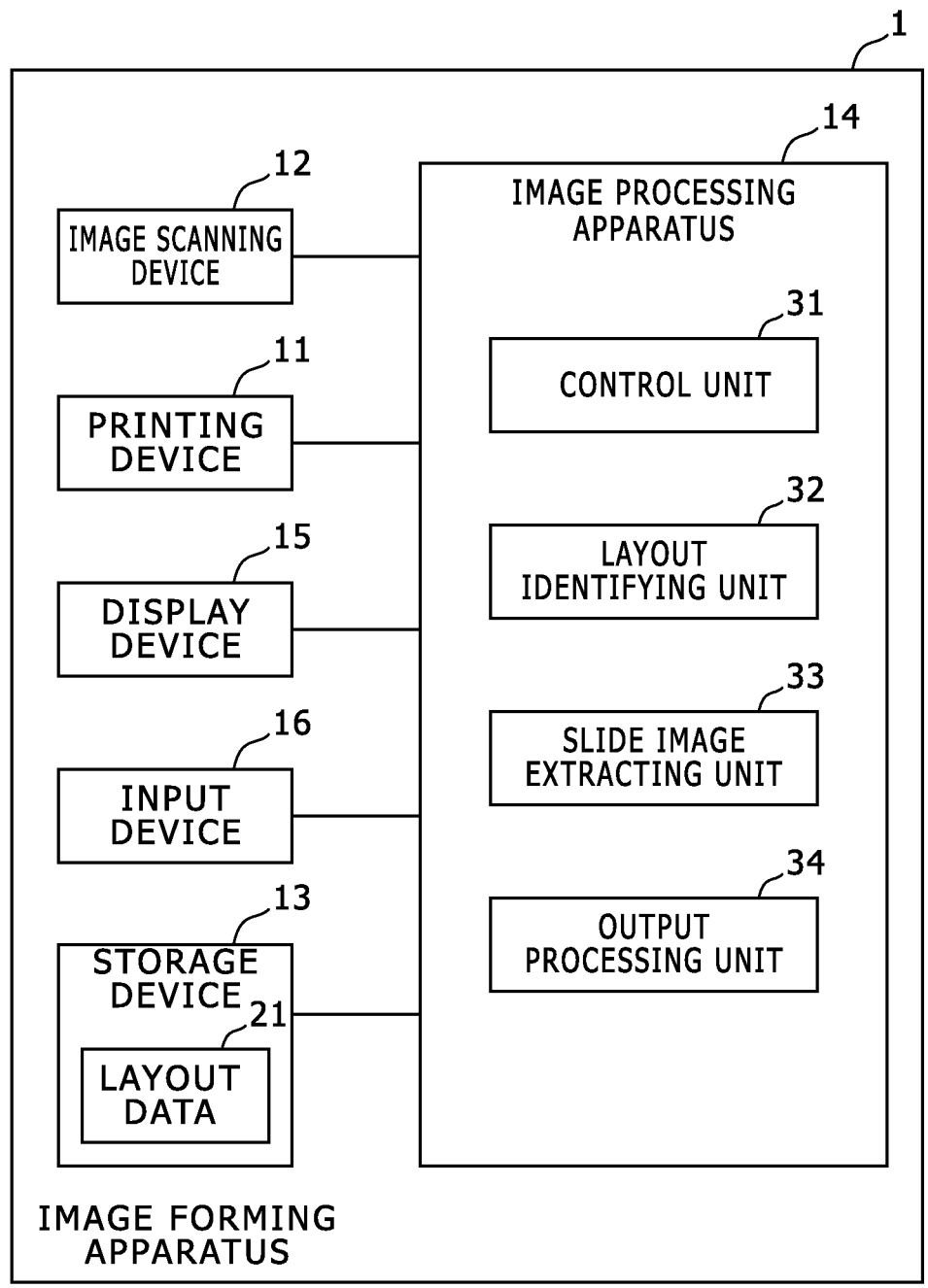
FIG. 1 shows a block diagram that indicates an example of a configuration of an image forming apparatus that includes an image processing apparatus according to an embodiment of the present disclosure.

FIG. 1 shows a block diagram that indicates an example of a configuration of an image forming apparatus that includes an image processing apparatus according to an embodiment of the present disclosure. The image forming apparatus 1 is a multi function peripheral, but may be a scanner, a copier or the like.

The image forming apparatus 1 includes a printing device 11, an image scanning device 12, a storage device 13, an image processing apparatus 14, a display device 15, and an input device 16.

The printing device 11 is an internal device that prints a document image based on image data for which sorts of image processing have been performed by the image processing apparatus 14, for example, in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the storage device 13 is a non volatile rewritable storage device such as a flash memory and stores sorts of data and programs. In the storage device 13, layout data 21 is stored.

The layout data 21 is data used by a layout identifying unit 32 mentioned below and that indicates plural printing layouts of specific presentation material editing software that builds a slide image.

The layout data 21 includes area information that indicates each position and each size of one or more slide images in a page for each printing layout, and for a specific printing layout, additionally includes (a) area information that indicates each position and each size of one or more attached images such as ruled line set or (b) area information that indicates a position and a size of a text note associated with the slide image but not included in the slide image.

Figure 2:
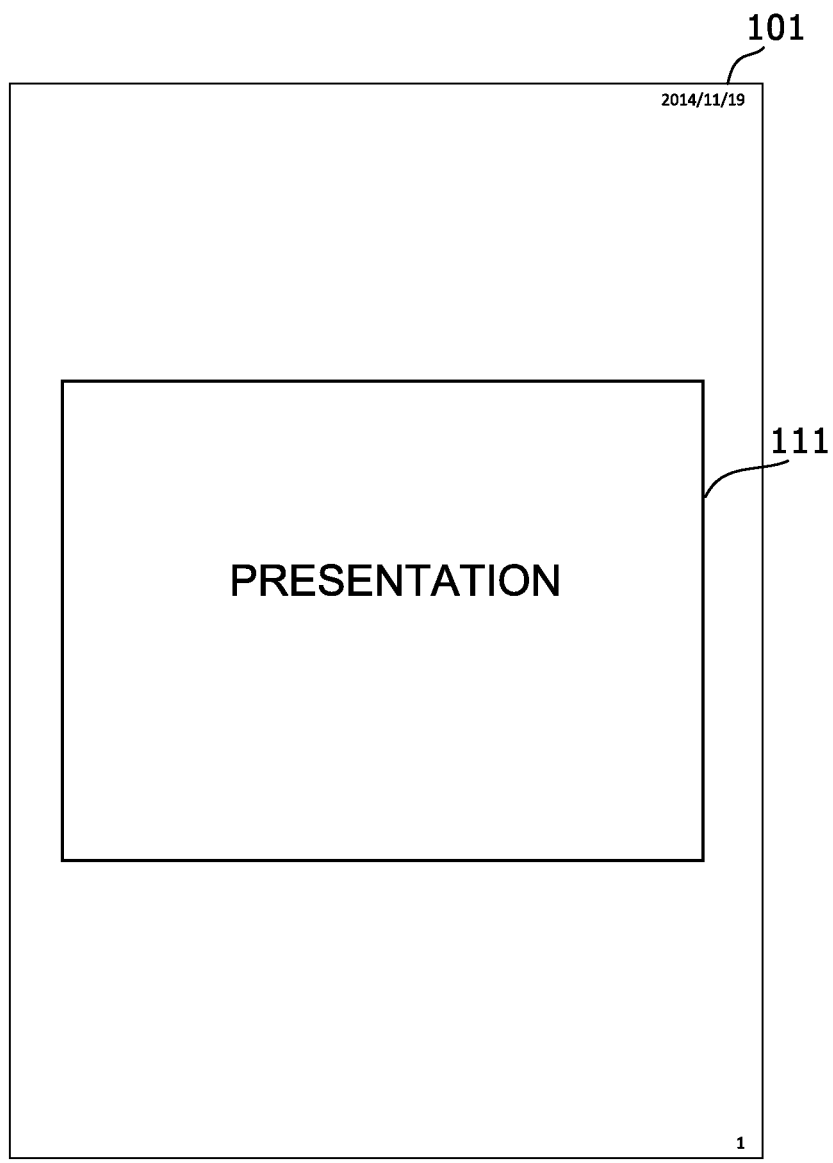
FIG. 2 shows a diagram that indicates a printing layout for 1-in-1 handout printing of Microsoft PowerPoint as presentation material editing software.

FIG. 2 shows a diagram that indicates a printing layout for 1-in-1 handout printing of Microsoft PowerPoint as presentation material editing software. In this case, one slide image 111 is arranged in a document image 101 of one page.

Figure 3:
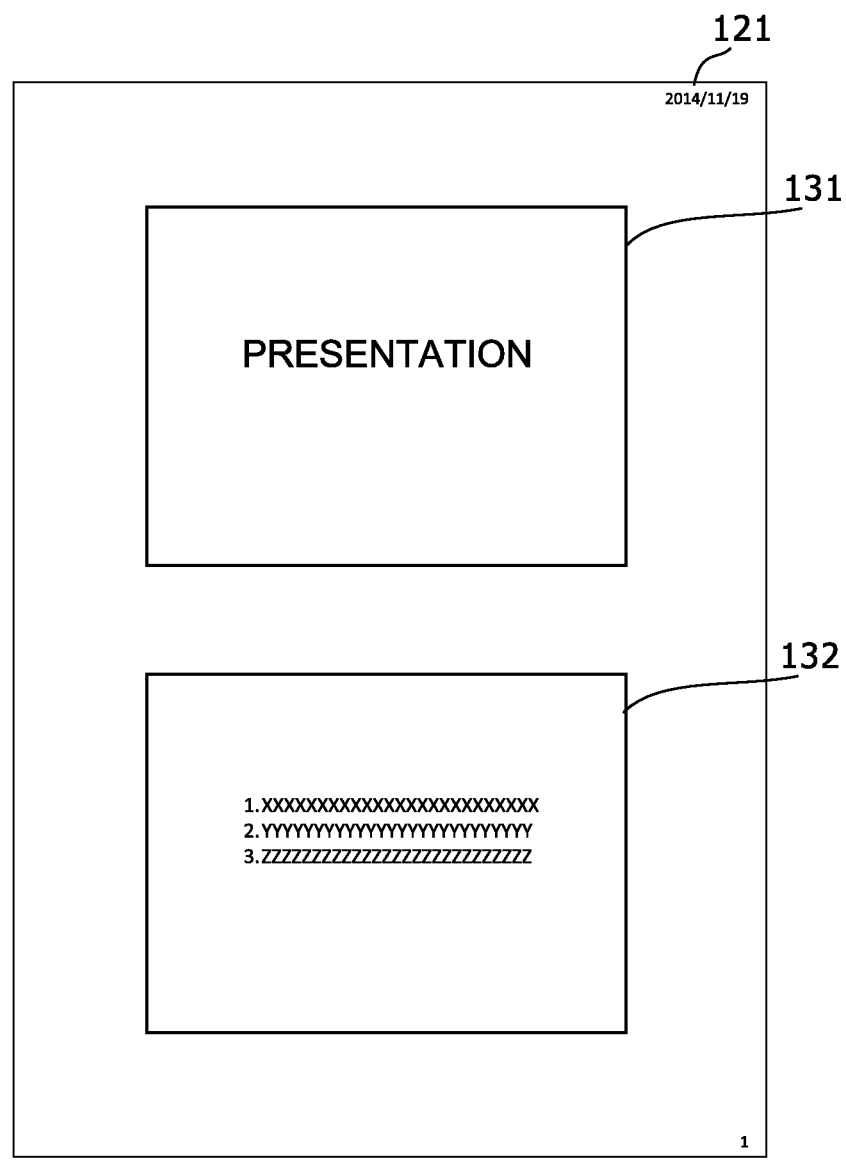
FIG. 3 shows a diagram that indicates a printing layout for 2-in-1 handout printing of Microsoft PowerPoint as presentation material editing software.

FIG. 3 shows a diagram that indicates a printing layout for 2-in-1 handout printing of Microsoft PowerPoint as presentation material editing software. In this case, two slide images 131 and 132 are arrayed in a vertical direction and arranged in a document image 121 of one page.

Figure 4:
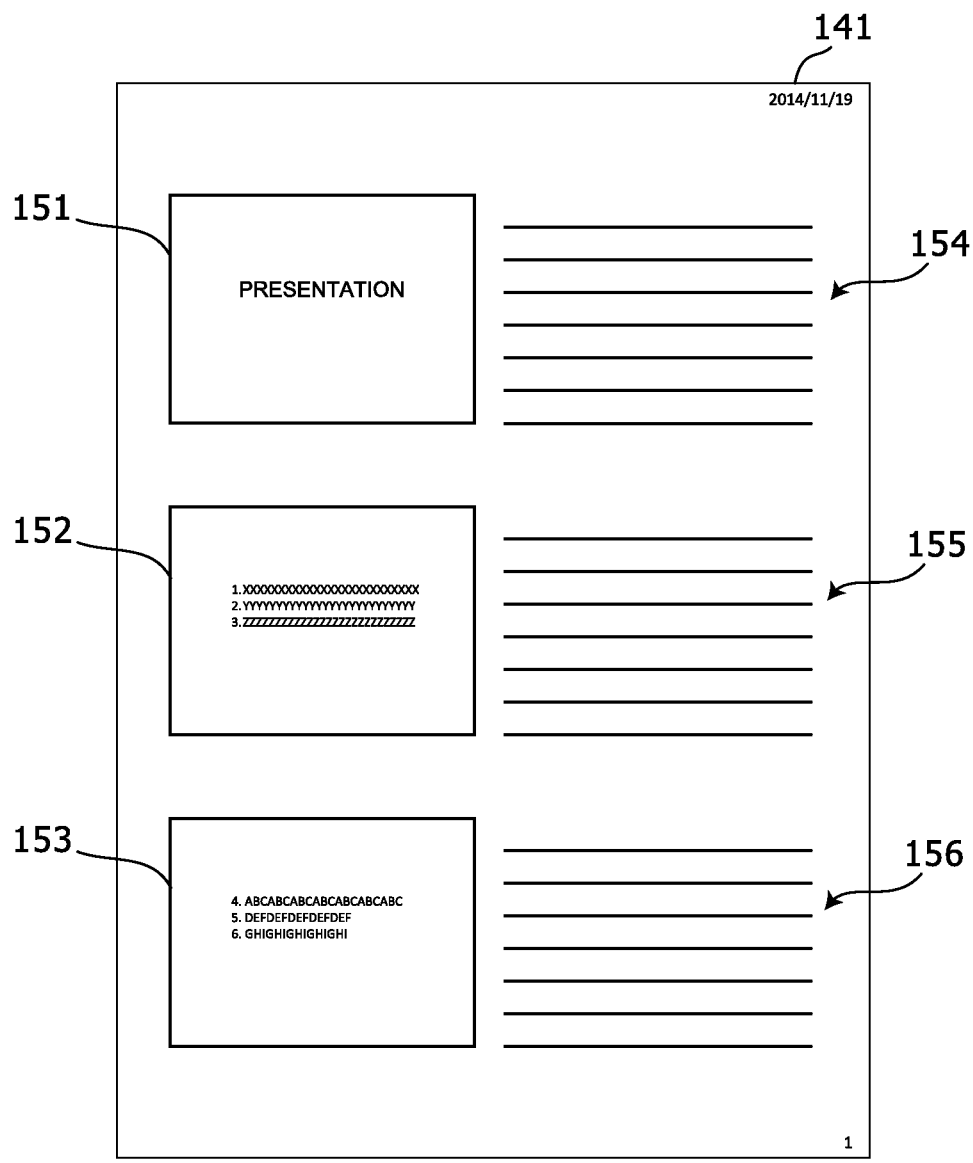
FIG. 4 shows a diagram that indicates a printing layout for 3-in-1 handout printing of Microsoft PowerPoint as presentation material editing software.

FIG. 4 shows a diagram that indicates a printing layout for 3-in-1 handout printing of Microsoft PowerPoint as presentation material editing software. In this case, three slide images 151 to 153 are arrayed in a vertical direction and arranged in a document image 141 of one page, and ruled line sets 154 to 156 as attached images are arranged horizontally beside the slide images 151 to 153 respectively.

Figure 5:
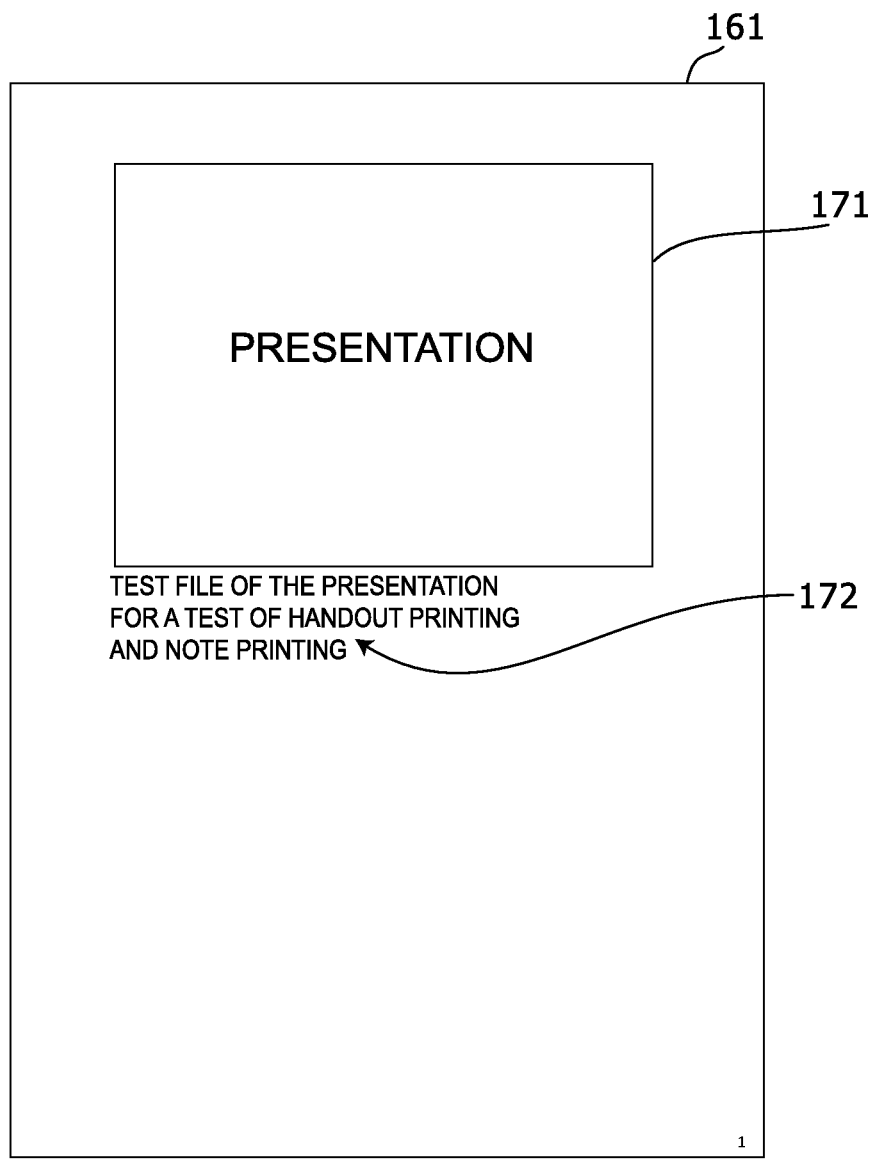
FIG. 5 shows a diagram that indicates a printing layout for note printing of Microsoft PowerPoint as presentation material editing software.

FIG. 5 shows a diagram that indicates a printing layout for note printing of Microsoft PowerPoint as presentation material editing software. In this case, in a document image 161 of one page, one slide image 171 is arranged in an upper part of the document image 161 and a text note 172 associated with the slide image 171 is arranged in a lower part than the upper part.

The image processing apparatus 14 performs image processing for image data such as the image data generated by the image scanning device 12.

The image processing apparatus 14 is embodied with an ASIC (Application Specific Integrated Circuit), a computer or the like, and includes a control unit 31, a layout identifying unit 32, a slide image extracting unit 33, and an output processing unit 34.

The control unit 31 is a processing unit that controls an internal device such as the image scanning device 12, and causes the image scanning device 12 to perform scanning a document image, and obtains image data of the document image from the image scanning device 12.

The layout identifying unit 32 identifies a printing layout of a document image scanned by the image scanning device 12 on the basis of the layout data 21.

Specifically, the layout identifying unit 32 detects sorts of objects such as line drawing (e.g. frame line, ruled line or the like), character or photograph (i.e. image with gradation) in a document image based on the obtained image data, and identifies a printing layout that agrees with a position, a size and a type of the detected object among plural printing layouts indicated by the layout data 21.

The layout identifying unit 32 may detect a line drawing and a character using a labeling process based on a binary image obtained through binarization from the document image.

Further, if an object detected in the document image is positioned in an area indicated by a printing layout and no objects are detected in the other part (except for a header part and a footer part) than the area indicated by the printing layout, then the layout identifying unit 32 may identify this printing layout as a printing layout of the document image.

The slide image extracting unit 33 extracts a slide image in the document image in accordance with the printing layout identified by the layout identifying unit 32.

For example, in case of combination printing with a specific combination quantity (N of N-in-1 printing) set in the specific presentation material editing software, if for the combination printing, the layout data 21 indicates a printing layout that includes (a) area information of the same number of slide images as the specific combination quantity and (b) area information of specific attached images associated respectively with the slide images, then the slide image extracting unit 33 extracts the slide images while excluding the attached images in the document image on the basis of the layout data 21.

For example, in case of 3-in-1 handout printing of Microsoft PowerPoint as the aforementioned specific presentation material editing software (FIG. 4), the three slide images 151 to 153 are arrayed in a vertical direction, and the ruled line sets 154 to 156 of horizontal ruled lines are arranged horizontally beside the slide images 151 to 153 respectively. For this layout, the layout data 21 indicates a position and a size of each one of the slide images 151 to 153 and a position and a size of each one of the ruled line sets 154 to 156. Therefore, on the basis of a position and a size of a ruled line set detected as an object in a document image, the layout identifying unit 32 identifies the document image as a document image of such 3-in-1 handout printing rather than 6-in-1 handout printing, and the slide image extracting unit 33 extracts three slide images in the document image in accordance with the printing layout identified by the layout identifying unit 32. Thus, the slide image extracting unit 33 does not extract the aforementioned ruled line set (as a slide image).

Further, for example, in the specific presentation material editing software, note printing prints a text note with a slide image, and the text note is associated with the slide image and not included in the slide image. In case of such note printing, if for the note printing, the layout data 21 indicates a printing layout that includes (a) area information of a slide image and (b) area information of a specific text note associated with the slide image, then the slide image extracting unit 33 extracts the slide image while excluding the text note in the document image on the basis of the layout data 21.

For example, in case of note printing of Microsoft PowerPoint as the aforementioned specific presentation material editing software (FIG. 5), the single slide image 171 is arranged in an upper part of a page and the text note 172 of the slide image 171 is arranged directly under the slide image 171. For this layout, the layout data 21 indicates a position and a size of the slide image 171 and a position and a size of an arrangeable area for a text note of the slide image 171. The position and the size of this arrangeable area for a text note are different from a position and a size of a slide image in a lower part of a page in the printing layout of 2-in-1 handout printing (FIG. 3), and therefore on the basis of a position and a size of a text in a document image, the layout identifying unit 32 identifies the document image as a document image of such note printing rather than 2-in-1 handout printing, and the slide image extracting unit 33 extracts one slide image in the document image in accordance with the printing layout identified by the layout identifying unit 32. Thus, the slide image extracting unit 33 does not extract the text (as a slide image).

As mentioned below, if the output processing unit 34 uses this text as a text note, the slide image extracting unit 33 extracts this text for a text note and provides the text to the output processing unit 34. In this process, the slide image extracting unit 33 or the output processing unit 34 converts an image part that includes the text to text data using an OCR (Optical Character Recognition) technique, and uses the text data for a text note.

The output processing unit 34 is a processing unit that performs an output process for a slide image extracted by the slide image extracting unit 33. For example, as an output process, the output processing unit 34 performs generating a data file of specific presentation material editing software including the extracted slide image. Further, for example, as an output process, the output processing unit 34 performs printing of the extracted slide image using the printing device 11.

Furthermore, in case of a printed matter of the aforementioned note printing, when generating the aforementioned data file in the output process, the output processing unit 34 may generate a data file of the specific presentation material editing software so that the data file includes the text note extracted from the document image as a text note of the slide image extracted by the slide image extracting unit 33.

It should be noted that if a user sets that the output processing unit 34 should perform printing one slide image per page, then each combination-printed slide image is enlarged, and therefore the control unit 31 causes the image scanning device 12 to scan the document image with a predetermined high resolution.

The following part explains a behavior of the aforementioned image processing apparatus 14.

For example, when a user wants to enlargingly print a slide image in a material printed by specific presentation material editing software or when a user wants to restore an original data file from such material and enlargingly display a slide image based on the restored original data file, the user performs setting for such process to the image forming apparatus 1, sets the material as a document onto the image scanning device 12, and performs a user operation to the input device 16 in order to perform such process.

Upon detecting such user operation, in the image processing apparatus 14, the control unit 31 performs image scanning of the document using the image scanning device 12 and obtains image data of the scanned document image.

Subsequently, the layout identifying unit 32 identifies a printing layout of the document image based on the obtained image data by referring to the layout data 21.

When the layout identifying unit 32 identifies the printing layout of the document image, the slide image extracting unit 33 subsequently extracts a slide image by referring to the layout data 21 on the basis of area information of a slide image in the identified printing layout. Therefore, the slide image is extracted with a size of a slide image specified in the layout data 21. Consequently, even if the slide image does not have flame lines in the document image, the slide image is extracted with the accurate size.

Subsequently, the output processing unit 34 performs an output process (generating a data file in a specific file format of the specific software, printing the slide image, and/or the like) specified by the user using the extracted slide image.

In the aforementioned embodiment, the layout identifying unit 32 identifies a printing layout of a document image scanned by the image scanning device 12 on the basis of the layout data 21 that indicates plural printing layouts of specific presentation material editing software that builds a slide image. The slide image extracting unit 33 extracts a slide image in the document image in accordance with the identified printing layout, and the output processing unit 34 performs generating a data file of the specific presentation material editing software including the extracted slide image and/or printing of the extracted slide image as an output process of the slide image extracted by the slide image extracting unit 33.

Consequently, a printing layout is properly identified of a document that has been printed by the specific presentation material editing software.

The description has been presented for purposes of illustration and description, and is not intended to be exhaustive or limited.

For example, the aforementioned embodiment gives Microsoft PowerPoint as an example of the presentation material editing software. Alternatively, it is possible to perform the same process for software compatible with Microsoft PowerPoint or other presentation material editing software by producing and using the layout data 21 corresponding to a print layout of such software.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
a layout identifying unit configured to identify a printing layout of a document image scanned by an image scanning device on the basis of layout data, the layout data indicating plural printing layouts of specific presentation material editing software that builds a slide image;
a slide image extracting unit configured to extract a slide image in the document image in accordance with the identified printing layout;
an output processing unit configured to perform generating a data file of the specific presentation material editing software including the extracted slide image and/or printing of the extracted slide image as an output process of the slide image extracted by the slide image extracting unit,
wherein the layout data indicates a printing layout for combination printing with a specific combination quantity set in the specific presentation material editing software, the printing layout including (a) area information of the same number of slide images as the specific combination quantity and (b) area information of specific attached images associated respectively with the slide images; and
the slide image extracting unit extracts the slide images while excluding the attached images in the document image on the basis of the layout data.

2. An image processing apparatus, comprising:
a layout identifying unit configured to identify a printing layout of a document image scanned by an image scanning device on the basis of layout data, the layout data indicating plural printing layouts of specific presentation material editing software that builds a slide image;
a slide image extracting unit configured to extract a slide image in the document image in accordance with the identified printing layout;
an output processing unit configured to perform generating a data file of the specific presentation material editing software including the extracted slide image and/or printing of the extracted slide image as an output process of the slide image extracted by the slide image extracting unit,
wherein the layout data indicates a printing layout for note printing in the specific presentation material editing software, the note printing printing a text note with a slide image, the text note associated with the slide image and not included in the slide image, the printing layout including (a) area information of a slide image and (b) area information of a specific text note associated with the slide image; and the slide image extracting unit extracts the slide image while excluding the text note in the document image on the basis of the layout data.

3. The image processing apparatus according to claim 2, wherein the output processing unit generates a data file of the specific presentation material editing software including the extracted slide image in the output process, the data file including the text note extracted from the document image as a text note of the slide image extracted by the slide image extracting unit.

* * * * *